USO10158960B1

(12) United States Patent
Møller (10) Patent No.: US 10,158,960 B1
(45) Date of Patent: Dec. 18, 2018

(54) DYNAMIC MULTI-SPEAKER OPTIMIZATION

(71) Applicant: Roku, Inc., Los Gatos, CA (US)

(72) Inventor: Brian Møller, Hojbjerg (DK)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/915,740

(22) Filed: Mar. 8, 2018

(51) Int. Cl.
  *H04R 5/02* (2006.01)
  *H04S 7/00* (2006.01)
  *H04S 3/00* (2006.01)
  *H04R 3/04* (2006.01)
  *H04R 5/04* (2006.01)

(52) U.S. Cl.
  CPC ............... *H04S 7/301* (2013.01); *H04R 3/04* (2013.01); *H04R 5/02* (2013.01); *H04R 5/04* (2013.01); *H04S 3/008* (2013.01); *H04R 2420/05* (2013.01); *H04S 2400/13* (2013.01)

(58) Field of Classification Search
  CPC H04S 7/301; H04S 3/008; H04R 3/04; H04R 5/02
  See application file for complete search history.

(56) References Cited

U.S. PATENT DOCUMENTS

| | | | | |
|---|---|---|---|---|
| 2009/0016543 | A1* | 1/2009 | Maruko | H04R 3/04 381/61 |
| 2009/0274322 | A1* | 11/2009 | Chang | H03G 9/005 381/107 |
| 2016/0353196 | A1* | 12/2016 | Baker | H04R 1/1083 |
| 2017/0048615 | A1* | 2/2017 | Son | H03G 3/3005 |

* cited by examiner

*Primary Examiner* — Simon King
(74) *Attorney, Agent, or Firm* — Sterne, Kessler, Godstein & Fox P.L.L.C.

(57) ABSTRACT

Methods, systems, and computer program products for dynamically reproducing audio content at an optimal level using a plurality of heterogeneous speaker devices are disclosed herein. The method comprises operations including: comparing the first performance information associated with a first speaker device to second performance information associated with a second speaker device, determining which of the speaker devices is a preferred output device based at least in part on the comparison, and reproducing filtered audio signals via the preferred output devices in response to a request to playback audio content.

20 Claims, 6 Drawing Sheets

DYNAMIC MULTI-SPEAKER OPTIMIZATION

TECHNICAL FIELD

Embodiments included herein generally relate to creating a desired listening experience for users in home entertainment systems. More particularly, embodiments relate to creating the desired listening experience for users employing a plurality of wireless digital audio speakers having different audio configurations and/or performance capabilities.

BACKGROUND

When experiencing media/content having an audio component (e.g., movies, video, music, games, Internet content, etc.) a user may endeavor to reproduce the audio component via multiple speaker devices. For instance, a user may wish to employ a plurality of heterogeneous speaker devices to playback the audio component. In some examples, the plurality of speaker devices may include speaker devices designed by different speaker device manufacturers, and/or multiple speaker device models designed by a common speaker device manufacturer.

Individual speakers having different playback capabilities may sound poor when employed together in a multi-speaker device system. Thus, what is needed is a means for dynamically reproducing audio content at an optimal level using a plurality of heterogeneous speaker devices.

SUMMARY

An embodiment includes a method for dynamically configuring audio reproduction via a local speaker device of a heterogeneous plurality of speaker devices. The method operates by causing the local speaker device to identify first performance information associated with the local speaker device of the heterogeneous group of speaker devices, and receive second performance information associated with a remote speaker device of the heterogeneous group of speaker devices. Further, the local speaker device compares the first performance information to the second performance information, and determines whether the local speaker device is a preferred output device at a mapping of a frequency band to a speaker volume based at least in part on the comparison. When the local speaker device determines that the local speaker device is a preferred output device at a mapping of a frequency band to a speaker volume, the local speaker device generates a filter setting indicating that the local speaker device is the preferred output device at the mapping of the frequency band to the speaker volume. In addition, the local speaker device receives an audio signal associated with digital content, at least a portion of the audio signal to be reproduced by the local speaker device. Next, the local speaker devices determines a volume setting associated with the audio signal corresponds to the mapping of the frequency band to the speaker volume, and filters, the audio signal based on the filter setting and the volume setting. In some embodiments, the volume setting refers to a volume level associated with playback of media content. For example, the volume setting may include a decibel level requested by a user for playback of an audio component of media content. In some other examples, the volume setting may correspond to a default decibel level associated with playback of an audio component of media content.

Another embodiment includes a speaker device comprising a wireless communication interface, amplifier circuitry and an associated speaker, and a memory storing first performance information indicating a first performance value at a mapping of a frequency band to a device volume. Further, the speaker device includes one or more processors and/or circuits configured to receive, via the wireless interface, second performance information associated with a remote speaker device, compare the first performance information to the second performance information, determine the local speaker device is a preferred output device at the mapping of the frequency band to the device volume, and store, to the memory, a filter setting indicating that the local speaker device is the preferred output device at the mapping of the frequency band to the device volume.

Another embodiment includes a system comprising a first speaker device associated with first performance information, and a second speaker device associated with second performance information. In addition, the second speaker device includes one or more processors and/or circuits configured to receive the first performance information associated with the first speaker device, compare the first performance information to the second performance information, generate a filter setting indicating that the second speaker device is the preferred output device over the first speaker device at a mapping of a frequency band to a device volume, receive a content signal from a remote content device, filter the content signal based at least in part on the filter setting to generate a filtered audio signal, amplify the content signal to determine an amplified content signal, and reproduce the amplified content signal via a speaker of the second speaker device.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS

The accompanying drawings, which are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, method, computer program product and/or device embodiments, and/or combinations thereof, for dynamically reproducing audio content at an improved or optimal level using a plurality of heterogeneous speaker devices.

Figure 1:
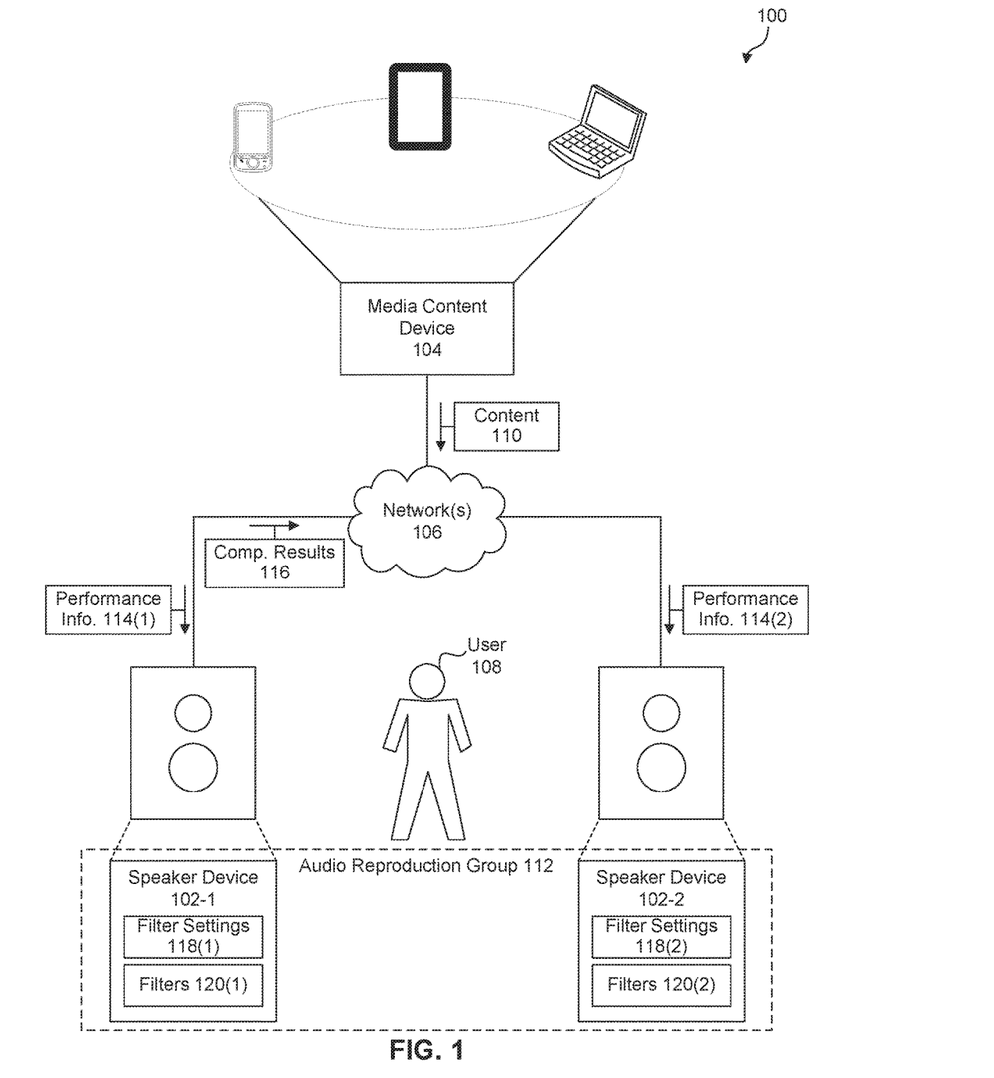
FIG. 1 illustrates a home entertainment system for performing dynamic multi-speaker optimization with a plurality of heterogeneous speaker devices, according to some embodiments.

FIG. 1 illustrates a home entertainment system 100 for performing dynamic multi-speaker optimization with a plurality of heterogeneous speaker devices. Referring to FIG. 1, the home entertainment system 100 includes a plurality of speaker devices 102 (i.e., speaker device 102(1) and speaker device 102(2)) placed in any location and/or configuration within a listening environment 101, and a media content device 104. Each speaker device 102 can be wired or wireless. Although FIG. 1 illustrates two speaker devices 102, the home entertainment system 100 can include any number of speaker devices 102. The media content device 104 may be, without limitation, a media player, television, a wireless device, a smartphone, a tablet computer, a laptop/mobile computer, a handheld computer, a server computer, an in-appliance device, streaming media player, a game console, and/or an audio/video receiver, to name just some examples. In some embodiments, the media content device 104 may be located in the same listening environment 101 as the plurality of speaker devices 102. Additionally, or alternatively, the media content device 104 may be located remotely from the speaker devices 102.

Further, the speaker devices 102 and the content device 104 may communicate via a communication network(s) 106. The communication network 106 may include any or all of a wired and/or wireless private network, personal area network (PAN), Local-Area Network (LAN), a Wide-Area Network (WAN), or the Internet.

In some embodiments, a user 108 may endeavor to playback audio content 110 stored on the content device 104 using speaker device 102-1 and speaker device 102-2. As such, the user 108 may form an audio reproduction group 112 including the speaker device 102-1 and speaker device 102-2. In some embodiments, an audio reproduction group 112 includes the plurality of speaker devices 102 that may be used to reproduce media content. Further, the audio reproduction group 112 may synchronously reproduce media content from a source device (e.g., the content device 104). In some examples, the user 108 may employ a pairing functionality of the speaker devices 102 to form the audio reproduction group 112. For instance, the speaker device 102(1) may determine that the distance between speaker device 102(1) and speaker device 102(2) is less than a predetermined amount, and attempt to form an audio reproduction group 112. In another instance, the speaker device 102(1) may attempt to form an audio reproduction group 112 in response to input from the user 108.

Once the speaker devices 102 have joined the audio reproduction group 112, the speaker devices 102 may exchange performance information 114. In some examples, the performance information 114 includes data indicating the performance capabilities of the speaker devices 102 across a range of frequencies and/or reproduction volume levels. For example, the performance information 114(1) may indicate the performance capabilities of the speaker device 102(1) at a plurality of frequency bands. Additionally, or alternatively, the performance information 114(1) may indicate the performance capabilities of the speaker device 102(1) at a plurality of frequency bands when reproducing audio content at particular volume levels.

In some embodiments, the performance information 114 includes a performance rating of a corresponding speaker device 102 on a rating scale. For example, the performance information 114(1) may including a rating (e.g., letter, number grade, series of stars, etc.) of the performance of the speaker device 102(1) at a particular frequency band and/or volume level. Additionally, or alternatively, the performance information 114 includes a frequency response of a corresponding speaker device 102. The frequency response of a speaker device is a function of the frequency of audio signals received by the speaker device in Hertz (Hz), and sensitivity of the speaker device in decibels (dB). The frequency response, which can often be displayed on a graph as a curve, describes how a device responds to audio signals across a range of frequencies. In a frequency response graph, frequencies are measured in Hz along a graph's x-axis, with sound pressure level measured in dB along the graph's y-axis. Desirable speaker devices have a flat curve response, meaning that low frequencies (20 Hz-500 Hz), medium frequencies (500 Hz to 5,000 Hz), and high frequencies (5,000 Hz-20 kHz) all have an equal volume. In some embodiments, the performance rating included in the performance information 114 may be based at least in part on the frequency response of the speaker device 102.

As illustrated in FIG. 1, the speaker device 102(1) may transmit the performance information 114(1) to the speaker device 102(2), and the speaker device 102(2) may transmit the performance information 114(2) to the speaker device 102(1). Upon receipt of the performance information 114(2), the speaker device 102(1) compares the performance information 114(1) to the performance information 114(2) to determine which of the speaker devices 102 should be the dominant speaker device at one of a plurality of frequency bands, a plurality of volume levels, or one or more mappings of a frequency band to a playback volume level. For example, the speaker device 102(1) may determine that the speaker device 102(1) is the preferred sound output device at a lower frequency band (e.g., 20 Hz-500 Hz) based at least in part on comparing the performance information 114(1) to the performance information 114(2). In some embodiments, the speaker devices 102 determine the preferred sound output device based on the performance value of the performance information 114(1) being greater than the performance value of the performance information 114(2). In some embodiments, the speaker devices 102 may determine that both speaker devices are the preferred sound output device when the performance information 114 indicates they have comparable performance capabilities.

As another example, the speaker device 102(1) may determine that the speaker device 102(1) is the preferred sound output device at a lower frequency band when the reproduction volume level is 40 dB based at least in part on comparing the performance information 114(1) to the performance information 114(2). As yet still another example, the speaker device 102(1) may determine that the speaker device 102(1) is the preferred sound output device at a lower frequency band when the reproduction volume level is within a specified range based at least in part on comparing the performance information 114(1) to the performance information 114(2).

Further, upon receipt of the performance information 114(1), the speaker device 102(2) may perform a similar comparison to determine which of the speaker devices 102 should be the dominant speaker device. Alternatively, one of the speaker devices may compare the performance information 114, and transmit the results of the comparison to the other speaker device. For example, upon receipt of the performance information 114(2), the speaker device 102(1) may determine which of the speaker devices 102 should be the dominant speaker device at one or more mappings of a reproduction volume to a frequency band, and send comparison results 116 identifying which of the speaker devices 102 should be the dominant speaker device at particular frequency bands and/or reproduction volume levels to the speaker device 102(2).

In some embodiments, the speaker device 102(1) determines that the speaker device 102(1) should be the dominant speaker device based at least in part on identifying a first performance value of the speaker device 102(1) within the performance information 114(1), and comparing the first performance value to a second performance value of the speaker device 102(2) within the performance information 114(2). In some other embodiments, the speaker device 102(1) determines that the speaker device 102(1) should be the dominant speaker device based on identifying the frequency response of the speaker device 102(1) within the performance information 114(1), and combining the performance of the speaker device 102(1) with the frequency response of speaker device 102(2) within the performance information 114(2) to generate a full range flat frequency response curve that indicates which speaker device should be the preferred output device at particular frequency bands and/or reproduction volume level and/or range as described herein with reference to FIG. 5C.

Once the speaker devices 102 determine which of the speakers should be the dominant speaker at each of the individual frequency bands, the speaker devices 102 generate filter settings 118 representing the results of the comparison of the performance information 114(1) to the performance information 114(2). For example, the filter settings 118 may indicate that the speaker device 102(1) is the preferred sound output device at a low frequency band. Further, as speaker devices 102 join and leave the audio reproduction group 112, the speaker devices 102 within the audio reproduction group 112 should compare the performance information 114 corresponding to current members of the audio reproduction group to determine whether to update the filter settings 118 in view of the membership update.

In some embodiments, the filter settings 118 may be modified based on user preference, audio effects, a geospatial relationship between the speaker devices 102, and/or one or more attributes of the listening environment 101. For instance, the filter settings may be modified based at least in part on audio features (bass, treble, balance, midrange, fading, etc.) selected by the user 108, a preferred sound mode (movie, music, surround decoder, direct playback, unprocessed, etc.) selected by the user 108, a movie mode (standard, sci-fi, adventure, drama, sports, etc.), a music mode (concert hall, chamber, cellar club, music video, 2 channel stereo, etc.) selected by the user 108, reproduction mode (e.g., stereo mode, surround sound mode, mono mode), as well as any other audio characteristics selected by the user 108.

Further, the filter settings 118 may be modified based at least in part on one or more acoustic anomalies. For example, the listening environment 101 may include acoustic anomalies, such as a room configuration that affects acoustics. Another acoustic anomaly may be coupling, reflections, or echoes from interaction between the speaker devices 102 and the walls of the listening environment 101. An additional acoustic anomaly may be audio effects caused by dynamic conditions of temperature, humidity and changing absorption.

Once the speaker devices 102 configure the filter settings 118, the filters 120 of the speaker devices 102 may implement the filter settings 118, respectively. For example, when the filter settings 118(2) indicate that the speaker device 102(1) is the preferred output device at a volume setting and a low frequency band, the filter 120(2) may modify the audio content 110 so that a portion of the audio content 110 corresponding to the low frequency band is not reproduced by the speaker device 102(2). However, the filters 120(2) may not remove portions of the audio content that do not correspond to the low frequency band from the audio signal reproduced by the speaker device 102(2). Further, the filter 120(1) may ensure that the speaker device 102(1) reproduces the portion of the audio content 110 corresponding to the low frequency band in accordance with the filter settings 118(1). However, the filters 120(1) may remove portions of the audio content that do not correspond to the low frequency band from the audio signal reproduced by the speaker device 102(1). In some embodiments, the filters 120 may be implemented as crossover filters in order to ensure that the audio content 110 is reproduced in accordance with the filter settings 118.

Further, the filters 120 may dynamically apply different filter settings 118 to the audio content 110 based upon a volume requested by the user 108. For example, the filter settings 118(1) may indicate that the speaker device 102(1) is the preferred output device at a mapping of a frequency band to a first volume level, and indicate that the speaker device 102(1) is not the preferred at a mapping of the same frequency band to a second volume level. Accordingly, when the user 108 selects that the audio content 110 be reproduced at the second volume level, the filters 120 may ensure that the speaker device 102(2) reproduces the portion of the audio content 110 corresponding to the frequency band in accordance with the filter settings 118.

According to some embodiments, the filters 120 may include linear time invariant (LTI) filters. Embodiments may use two types of LTI filters, Finite Impulse Response (FIR) filters and/or Infinite Impulse Response (IIR) filters.

Figure 2:
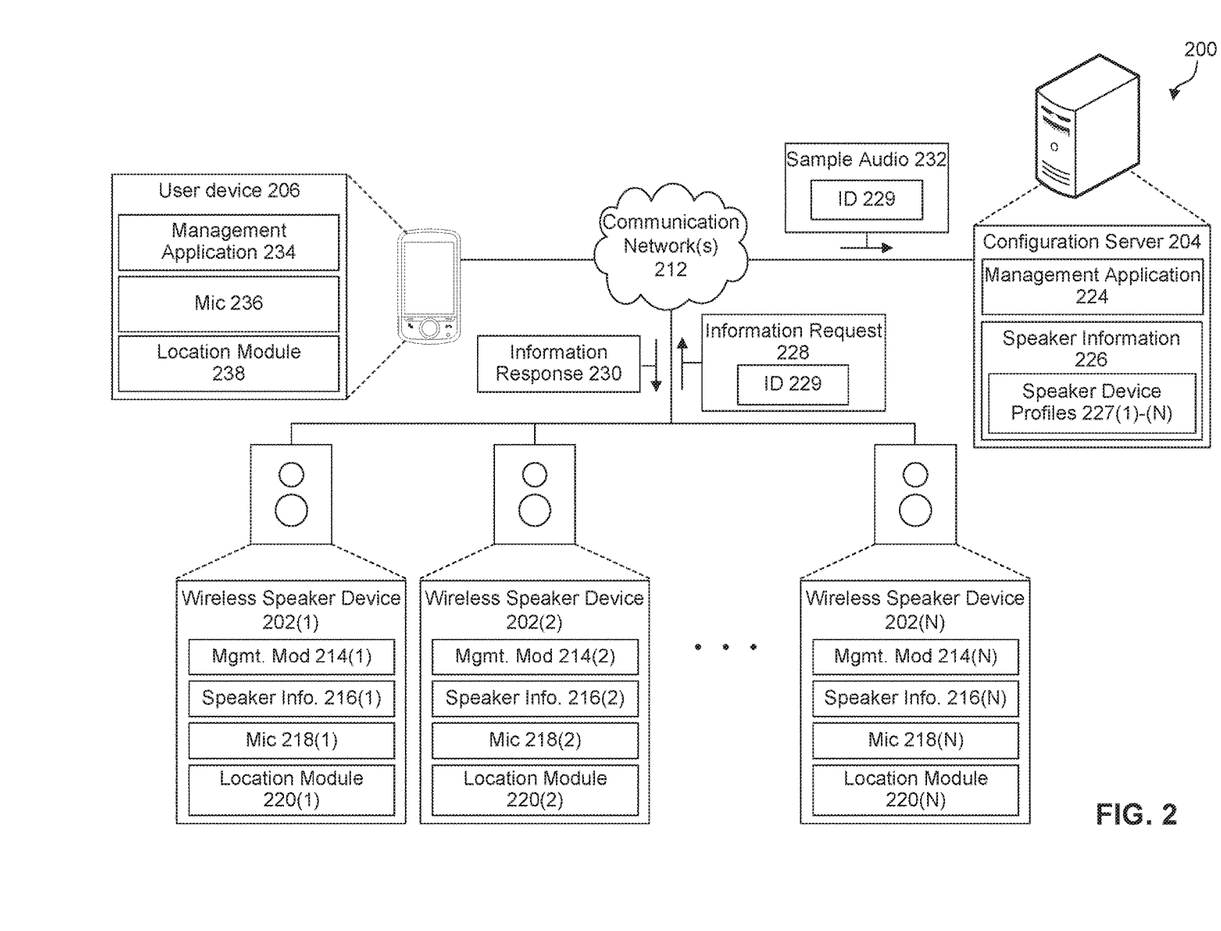
FIG. 2 illustrates a home entertainment system for configuring dynamic multi-speaker optimization with a plurality of heterogeneous speaker devices, according to some embodiments.

FIG. 2 illustrates a home entertainment system 100 for configuring dynamic multi-speaker optimization with a plurality of heterogeneous speaker devices. Referring to FIG. 2, the home entertainment system 200 includes a plurality of speaker devices 202(1)-(N), a configuration server 204, and a user device 206. In an embodiment, the speaker devices 202(1)-202(N) may include wired and/or wireless device speakers placed in any location and/or configuration by a user 208 within a listening environment 210. According to an embodiment, the speaker devices 202 may include a heterogeneous group of speaker devices. For example, the speaker devices 202 may include a plurality of speaker devices having different performance capabilities and/or speaker device attributes (e.g., manufacturer, brand, model, version, hardware, software, drivers, etc.). Further, the speaker devices 202, the configuration server 204, and the user device 206 may communicate via a communication network(s) 212. The communication network 106 may include any or all of a private network, personal area network (PAN), Local-Area Network (LAN), a Wide-Area Network (WAN), or the Internet. Further, the connection between any of the speaker devices 202, the configuration server 204, or the user device 206, and the communication network(s) 212 may be a wireless connection (e.g., Bluetooth™, Wi-Fi connection, etc.) or wired connection.

As illustrated in FIG. 2, the speaker device 202 includes management module 214 for managing operation of the speaker device, performance information 216 indicating the performance capabilities of the speaker device 202, a microphone 218 for recording speaker device performance, and a location module 220 for monitoring the location of the speaker device 202 within the listening environment 210. Individual speaker devices 202(1)-(N) are associated with individual performance information 222. For example, a first speaker device 202(1) is associated with a first performance information 222(1), a second speaker device 202(2) is associated with a second performance information 222(2), an Nth speaker device 202(N) is associated with an nth performance information 222(N), and so forth.

In some embodiments, a manufacturer of the speaker device 202 may determine the performance information 222 during the manufacturing process, and store the performance information 222 to a non-volatile memory component of the speaker device 202. For instance, a manufacturer of the speaker device 202(1) may perform a testing process to determine the performance information 222(1) corresponding to the speaker device 202(1). Furthermore, the manufacturer may store the performance information 222(1) to the speaker device 202(1) prior to the sale of the speaker device 202(1) to a customer (e.g., the user 208).

The configuration server 204 may be employed to configure the speaker devices 102. The configuration server 204 may include one or more servers or other types of computing devices that may be embodied in any number of ways. For instance, the modules, other functional components, and data may be implemented on a single server, a cluster of servers, a server farm or data center, a cloud-hosted computing service, and so forth, although other computer architectures may additionally or alternatively be used. In some embodiments, the configuration server 204 may be located in the same physical environment as the plurality of speaker devices 102. Additionally, or alternatively, the configuration server 204 may be located remotely from the speaker devices 102.

Further, while the figures illustrate the components and data of the configuration server 204 as being present in a single location, these components and data may alternatively be distributed across different computing devices and different locations in any manner. Consequently, the functions may be implemented by one or more computing devices, with the various functionality described above distributed in various ways across the different computing devices. Multiple configuration servers 204 may be located together or separately, and organized, for example, as virtual servers, server banks and/or server farms. The described functionality may be provided by the servers of a single entity or enterprise, or may be provided by the servers and/or services of multiple different entities or enterprises.

As illustrated in FIG. 2, the configuration server 204 includes a management application 224, and speaker device information 226 that includes speaker device profiles 227(1)-(N) corresponding to the speaker devices 202(1)-(N). For example, the first speaker device profile 227(1) is associated with the first speaker device 202(1), the second speaker device profile 227(2) is associated with the second speaker device 202(2), the Nth speaker device profile 227(N) is associated with the Nth speaker device 202(N), and so forth. The speaker device information 226 may include performance capabilities of various speaker devices 202, historic performance data collected from the speaker devices 202 and/or the user device 206, historic performance data collected with respect to the use of various speaker devices 202 in a common audio reproduction group, and/or user feedback.

Further, the management application 224 may provide the speaker device information 226 to the speaker devices 202. For example, the speaker device 202(1) may require speaker device information 226 corresponding to the speaker device 202(1). As such, the management module 214(1) or the user device 206 may send an information request 228 to the management application 224. As illustrated in FIG. 1, the information request 228 may include a speaker device identifier 229 corresponding to the speaker device 202(1). Upon receipt of the information request 228, the management application 224 may send an information response 230 including performance information and/or speaker settings corresponding to the speaker device 202(1). In some embodiments, the contents of the information response 230 are collected from the speaker device profile 227(1) corresponding to the speaker device 202(1) and/or other speaker devices 202 related to the speaker device 202(1). Once the speaker device 202(1) receives the information response 230, the management module 214(1) may store the contents of the information response 230 as the performance information 222(1).

In some embodiments, the contents of the information response 230 may be used to update the performance information 222(1). According to an example embodiment, the management application 224 may employ machine learning methods to update the performance information 222(1) and the speaker devices profiles 228(N) based at least in part on historic performance data collected by the configuration server 204. For instance, the historic performance data collected by the configuration server 204 may indicate that the performance information 222 determined by the manufacturer overestimates the performance capabilities of the speaker device 202(1) when reproducing audio at a particular frequency band. As a result, the management application 224 may generate more accurate performance values for the speaker device 202(1), and store the revised performance in the speaker device profile 227(1). Further, the management application 224 may transmit an information response 230 including the revised performance values to the speaker device 202(1). Upon receipt of the revised performance values, the speaker device 202(1) may update the performance information 222 with the revised performance values. Additionally, or alternatively, one of the speaker devices 202 or the user device 206 may be used to determine the revised performance values.

In some other embodiments, the home entertainment system 200 may dynamically determine the performance information 222. For example, the management module 214 may direct the speaker device 202(1) to play a test signal. Further, at least one of the speaker devices 202(1)-(N) may capture a recording of the test signal via the microphones 218(1)-(N). Further, the captured recording may be used to determine or update the performance information 222(1). For example, the captured recording may be sent to the configuration server 204 as the sample audio 232. In some embodiments, the sample audio 232 may include the speaker device identifier 229 corresponding to the speaker device 202(1). Upon receipt of the sample audio 232, the configuration server 204 may determine the performance information 222(1) based on the sample audio 232, and transmit the determined performance information 222(1) to the speaker device 202(1) in the information response 230. Additionally, or alternatively, one of the speaker devices 202 or the user device 206 may be used to determine the performance information 222(1) based on captured recording.

In addition, the user device 206 may be employed to configure the speaker devices 102. As illustrated in FIG. 2, the user device 204 may include a management application 234 for managing the speaker devices 202, a microphone 236 for capturing test signals reproduced by the speaker devices 202, and a location module 238 for determining the locations of the speaker devices 202 within the listening environment 210. Some examples of the user device 206, include smart phones and mobile communication devices, tablet computing devices, desktops, laptops, netbooks and other portable computers, wearable computing devices, and any other computing device capable of sending communications to the speaker devices 202 or the configuration server 204.

In some embodiments, the speaker devices 202 and/or the user device 206 may be used to customize the performance information 222 to better reflect the actual performance of the speaker devices 202 in view of contextual information (e.g., characteristics of the listening environment 210, geospatial relationship between the speaker devices 202, and/or preferences of the user 208). As described above, acoustic anomalies may affect the ability of the speaker devices 202 to perform in accordance with the performance information 222. Thus, it is necessary to monitor the performance of the speaker devices 202, and revise the performance information 222 to reflect the actual performance of the speaker devices 202.

In some embodiments, the location modules (the location modules 220 and the location module 238) and/or microphones (i.e., the microphones 218 and the microphone 236) may determine the proximity of a speaker device 202 to a wall and/or furniture, the proximity of a speaker device 202 to the user device 206, the distance between the speaker devices 202, the height of the placement of the speaker device 202, the orientation of the speaker device 202, and/or the position of the speaker device 202 within the listening environment 201. Once the speaker devices 202 and/or the user device 206 determine the aforementioned contextual information, the speaker devices 202 and/or the user device 206 may determine context-specific performance information 222 particular to the contextual information. Further, the speaker devices may employ the context-specific performance information 222 when the context is detected by at least one of the user device 206 and/or the speaker devices 202.

Further, the speaker devices 202 and the user device 206 may detect changes to the contextual information, and employ more appropriate context-specific performance information 222 in response. For example, the location module 220(1) of the speaker device 202(1) may determine that the speaker device 202(1) has been moved to a new location within the listening environment 210. As a result, the speaker device 202(1) may identify performance information 222(1) corresponding to the new location or determine new performance information 222(1) corresponding to the new location. Further, the performance information 222(1) corresponding to the new location may be used to determine filter settings (e.g., the filter settings 118) for a filter (e.g., the filter 120) applied by the speaker device 202(1) as described in FIG. 1.

In some embodiments, the contextual information may also be used to determine the extent to which to apply a filter (e.g., the filter 120). For example, the speaker device 202(1) may determine a change in the geospatial relationship between the speaker device 202(1) and the speaker device 202(2) based on the microphone 218(1) (e.g., the speaker device 202(1) may be placed in a different room than the speaker device 202(2)). Further, the user 208 may indicate to the speaker device 202(1) and/or the management application 234 that the user 208 will be located in the room containing the speaker device 202(1). As a result, even if the speaker device 202(2) is the preferred output device in accordance with the filter settings (e.g., 118), the filter settings may be slightly modified to rely at least partially on speaker device 202(1) given the proximity of the user 208 to the speaker device 202(1).

Figure 3:
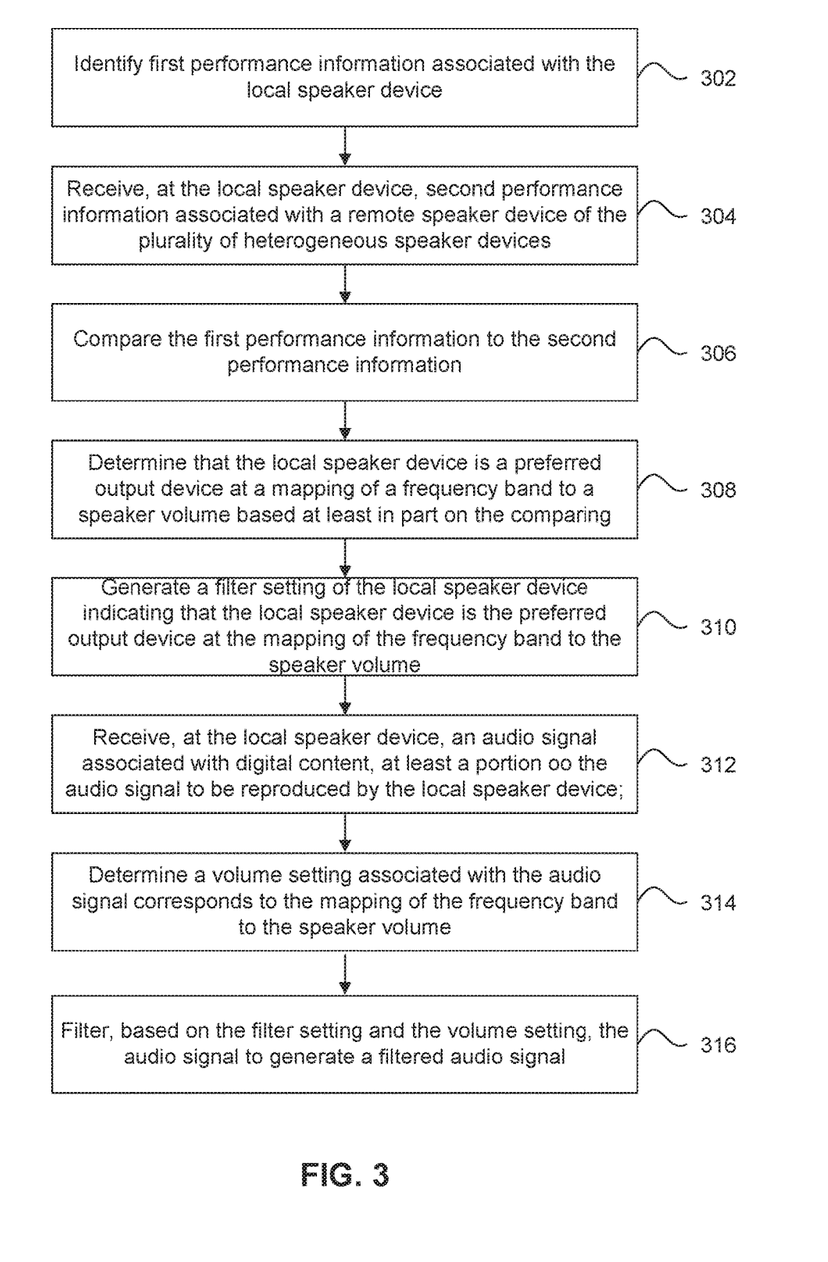
FIG. 3 is a flowchart for performing dynamic multi-speaker optimization with a plurality of heterogeneous speaker devices, according to some embodiments.

FIG. 3 is a flowchart for performing dynamic multi-speaker optimization with a plurality of heterogeneous speaker device, according to some embodiments. Process 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, a speaker device may identify first performance information associated with a local speaker device. For example, the speaker device 202(1) may identify pre-stored performance information 222(1) present on the speaker device 202(1). As another example, the speaker device 202(1) may transmit the information request 228 to the configuration server 204. In response, the configuration server 204 may transmit the information response 230 including the performance information 222(1) to the speaker device 202(1).

At 304, the speaker device may receive, at the local speaker device, second performance information associated with a remote speaker device of the plurality of heterogeneous speaker devices. For example, the speaker device 102(1) and the speaker device 102(2) may form an audio reproduction group 112. In some embodiments, the speaker devices may employ a management module (e.g., management module 214 or management application 234) to form the audio reproduction group 112. Once the audio reproduction group 112 has been formed, the speaker devices 102 may exchange the performance information 114.

At 306, the speaker device may compare the first performance information to the second performance information. For example, the speaker device 102(1) may compare the performance information 114(1) to the performance information 114(2). In some embodiments, the performance information 114 includes a performance rating of a corresponding speaker device 102 on a rating scale. Further, the performance information 114 may include and/or be based on a frequency responses of the speaker devices 102, respectively.

At 308, the speaker device may determine that the local speaker device is a preferred output device at a mapping of a frequency band to a speaker volume based at least in part on the comparing. For example, the speaker device 102(1) may determine that the speaker device 102(1) is the preferred sound output device at a lower frequency band (e.g., 20 Hz-500 Hz) based at least in part on comparing a performance value of performance information 114(1) to a performance value of the performance information 114(2). As another example, the speaker device 102(1) may determine that the speaker device 102(1) is the preferred sound output device at a lower frequency band when the reproduction volume level is 40 dB based at least in part on comparing frequency response information of the performance information 114(1) to frequency response information of the performance information 114(2). As yet still another example, the speaker device 102(1) may determine that the speaker device 102(1) is the preferred sound output device at a lower frequency band when the reproduction volume level is within a specified range based at least in part on comparing the performance information 114(1) to the performance information 114(2).

At 310, the speaker device may generate a filter setting of the local speaker device indicating that the local speaker device is the preferred output device at the mapping of the frequency band to the speaker volume. For example, the speaker devices 102 may generate filter settings 118 representing the results of the comparison of the performance information 114(1) to the performance information 114(2). In particular, the filter settings 118 may indicate that the speaker device 102(1) is the preferred sound output device at a low frequency band. Examples of filter settings tables generated by the speaker devices 102 are shown below in Tables 1 and 2.

TABLE 1

Filter Settings Table

| Frequency Band | Preferred Output Device |
|---|---|
| Low | Speaker Device A |
| Mid | Speaker Device B |
| High | Speaker Device C |

TABLE 2

Filter Settings Table

| Frequency Band | Volume Level | Preferred Output Device |
|---|---|---|
| Low | −3 dB | Speaker Device A |
| Low | −2.99 dB to 3 dB | Speaker Device B |
| Mid | −3 dB to 3 dB | Speaker Device A |

At 312, the speaker device may receive, at the local speaker device, an audio signal associated with digital content, at least a portion of the audio signal to be reproduced by the local speaker device. For example, the user 108 may employ the speaker devices 102 to reproduce content 110 received from the media content device 104.

At 314, the speaker device may determine a volume setting associated with the audio signal corresponds to the mapping of the frequency band to the speaker volume. For example, the user 108 may select a volume level of the speaker devices 102.

At 316, the speaker device may filter, based on the filter setting and the volume setting, the audio signal to generate a filtered audio signal. For example, speaker devices 102 may modify the content 110 using the filters 120 in accordance with the filter settings 118. For instance, if the filter settings 118(1) indicate that the speaker device 102(1) is the preferred output device at a mapping of a frequency band to a first volume level, the filters 120(2) may filter the audio signal reproduced by the speaker device 102(2) to ensure that the speaker device 102(2) does not reproduce the portion of the audio content 110 corresponding to the frequency band. By applying the filters 120 to the content 110 to generate a filtered audio signal in accordance with the filter settings 118, the speaker devices 102 dynamically interchange as the dominant speaker during audio reproduction of the content 110 based on the performance capability. Thereby ensuring that the user 108 is provided an optimal and/or improved listening experience.

Figure 4:
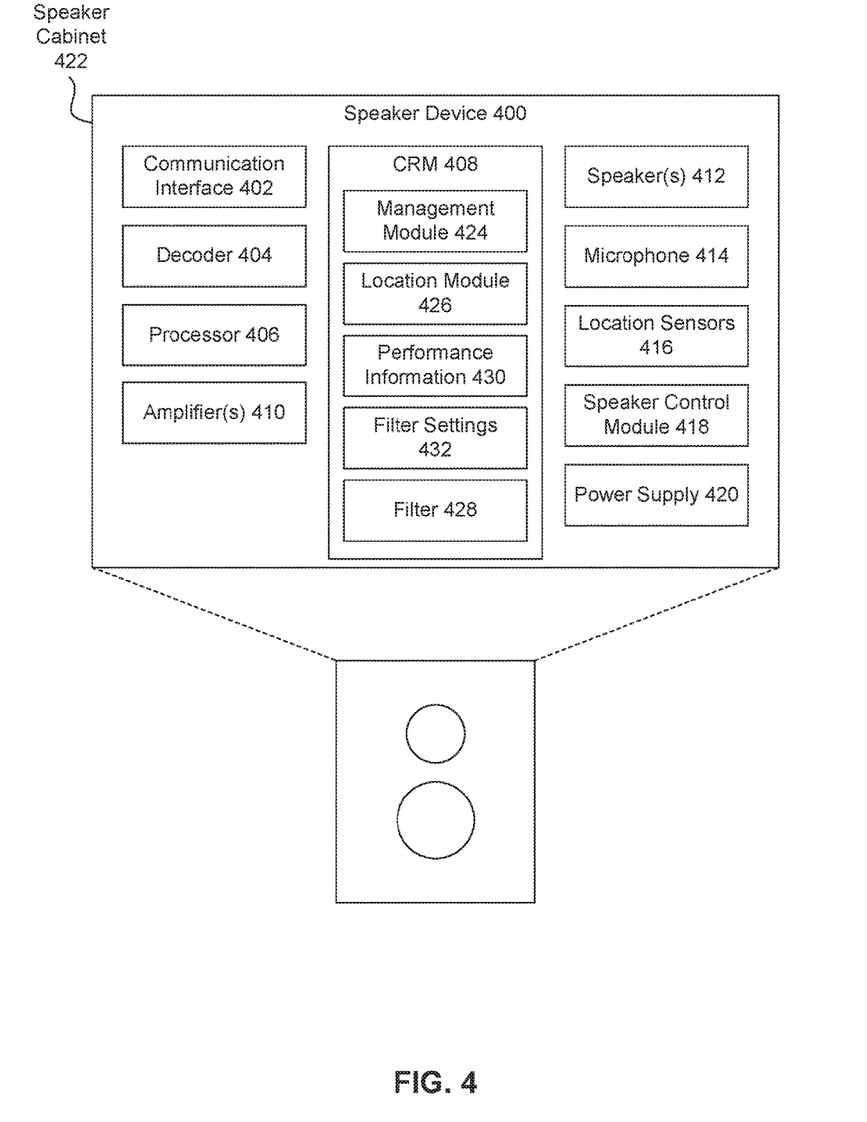
FIG. 4 illustrates a speaker device, according to some embodiments.

FIG. 4 is a block diagram of an example embodiment 400 of the speaker devices 102 and 202 shown in FIGS. 1 and 2, respectively. The speaker device 400 may comprise one or more communication interfaces 402 for receiving content (e.g., the audio content 110) from a content device (e.g., the media content device 104), a digital decoder 404 for decoding the content into its separate audio components; a processor 406 (e.g., digital signal processor), a non-transitory computer readable memory 408 coupled to the processor 406; one or more speaker amplifiers 410(1)-(N) (e.g., a tweeter amplifier, a midrange amplifier, and a woofer amplifier), one or more speaker transducers 412(1)-(N) coupled to the speaker amplifiers 410(1)-(N), respectively, a microphone 414, location sensors 416 (e.g., accelerometers, gyroscope, magnetometers, proximity devices, GPS, etc.) for determining a location of the speaker device 400, a speaker control module 418 for receiving user commands via one or more controls (e.g., buttons and/or a remote control interface), a power supply 420, and a speaker cabinet 422 to enclose components of the speaker device 400.

The communication interface(s) 402 include one or more interfaces and hardware components for enabling communication with various other devices, such as other speaker devices (e.g., the speaker devices 102), user devices (e.g., the user device 206), and configuration servers (e.g., the configuration server 204). For example, communication interface(s) 402 facilitate communication through one or more of the Internet, cellular networks, and wireless networks (e.g., Wi-Fi, cellular).

The non-transitory, tangible computer readable memory (CRM) 408 is used to store any number of functional components that are executable by the processor 406. In many implementations, these functional components comprise instructions or programs that are executable by the processors and that, when executed, specifically configure the one or more processors 406 to perform the actions attributed above to the speaker devices (e.g., the speaker devices 102 and the speaker devices 202). In addition, the non-transitory, tangible computer readable memory 408 stores data used for performing the operations described herein. In the illustrated example, the functional components stored in the non-transitory computer readable memory 408 include a management module 424 (e.g., the management module 214), location module 426 (e.g., the location module 220), and one or more filters 428 (e.g., the filters 120). In some embodiments, the location module includes a global positioning system (GPS) and/or an indoor positioning system (IPS) device. Further, the non-transitory computer readable memory 408 may store performance information 430 (e.g., the performance information 222) corresponding to the speaker device 400, and filter settings 432 (e.g., the filter settings 118) corresponding to the filters 428.

The processor 406 may select which portion of the content will be processed. In some embodiments, in a stereo mode, the speaker device 400 processes either the left stereophonic channel or right stereophonic channel. In a surround sound mode, the speaker device 400 selects a signal to process from among the multiple channels. The selection of the playback mode (e.g., stereo mode, mono mode, surround sound mode) may be performed via the speaker control module 418. In some embodiments, the filters 428 modify the content to determine the frequencies of the content that are reproduced by the speaker device 400 in accordance with the filter settings 432. This may be done by performing crossover, phase matching, and time alignment filtering function in a digital implementation. In some examples, the filters 428 may include FIR or IIR filters that implement a crossover filtering technique.

The output of the processor 406 may be a set of filtered digital audio signals, one for each of the speaker transducers 412(1)-(N). These signals may be directed to the inputs of digital amplifiers, which generate high power output signals that drive the speaker transducers 412(1)-(N) to produce an optimal and/or improved reproduction of the content in concert with one or more other speaker devices having different performance capabilities in accordance with the present invention.

It will be appreciated by those skilled in the art that the functionality of the speaker devices (e.g., speaker devices 102, speaker devices 202, speaker device 400) described herein can be performed by other home entertainment devices, such as a media player, television, a wireless device, a smartphone, a tablet computer, a laptop/mobile computer, a handheld computer, a server computer, an in-appliance device, streaming media player, a game console, an audio/video receiver, and so forth. In some embodiments, a home entertainment device may determine the preferred output devices of an audio reproduction group (e.g., audio reproduction group 112), and send filter settings (e.g., filter settings 118) indicating the determined preferred output devices to the speaker devices (e.g., speaker devices 102) of the an audio reproduction group.

Figure 5A:
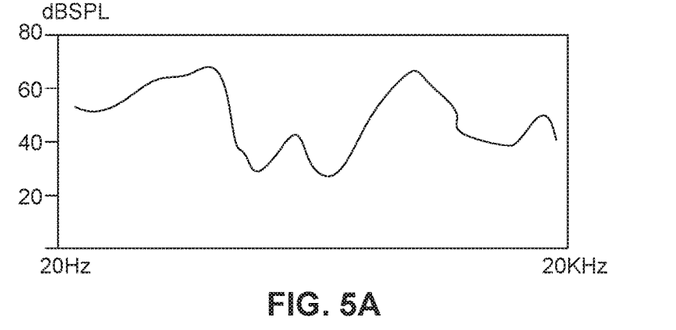
FIG. 5A-5C illustrates example frequency response information.
Figure 5B:
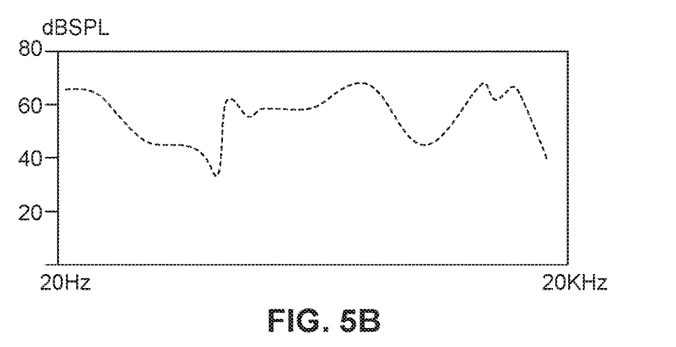
Figure 5C:
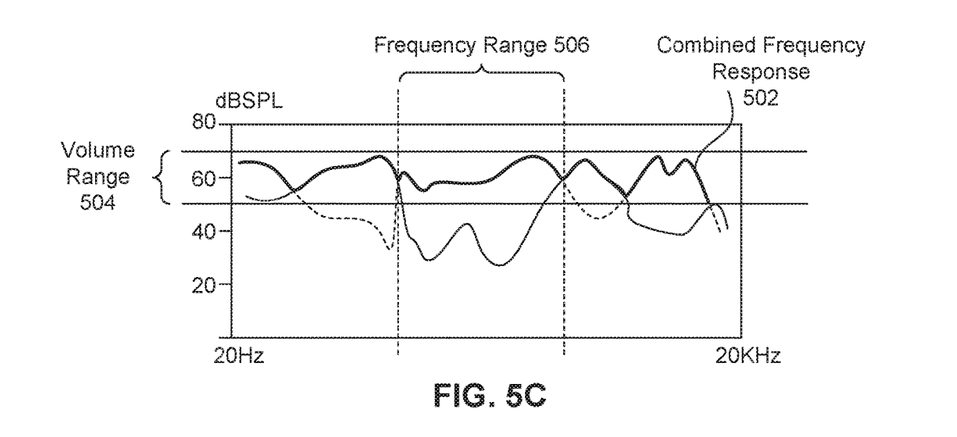

FIGS. 5A and 5B illustrate example frequency responses for a pair of speaker devices (e.g., the speaker device 102-1 and the speaker device 102-1) in an audio reproduction group (e.g., the audio reproduction group 112). FIG. 5C illustrates an example frequency response resulting from employing an embodiment of the present disclosure. As described in detail above, the speaker devices (e.g., the speaker device of an audio reproduction group exchange performance information (e.g., the performance information 114), and determine which of the speaker devices is the preferred output device at different frequency bands and/or volume levels.

In some embodiments, the speaker devices identify the preferred output device based on comparing the frequency responses of the speaker devices, and combining the frequency responses (i.e., frequency response (e.g., FIG. 5A) of a first speaker device with the frequency response (e.g., FIG. 5C) of a second speaker device) to generate a combined frequency response 502 that provides a full range flat response curve at a reproduction volume level requested by a user (e.g., the user 108). For example, suppose the user requests a volume level within the volume range 504. The speaker devices will configure the filter settings of the speaker devices such that the speaker device with the frequency response that is represented in the combined frequency response 502 is the preferred output device. For example, the first speaker device corresponding to the frequency response of FIG. B would be the preferred output device within the frequency range 506.

In some embodiments, the frequency responses of the audio reproduction group may be combined to form a curve other than a full range flat curve sound signature. For example, the combined frequency response 502 may be generated to form a "u-shaped" sound signature or a "v-shaped" sound signature in accordance with user preferences, a user audio profile, and/or an attribute of the content (e.g., genre). In some instances, the sound signature preferences and user audio profiles may be stored on the speaker device and/or a configuration device (e.g., the configuration server 204 or the user device 206). Further, the user may request that the audio reproduction group playback content in accordance with a selected sound signature.

Example Computer System

Figure 6:
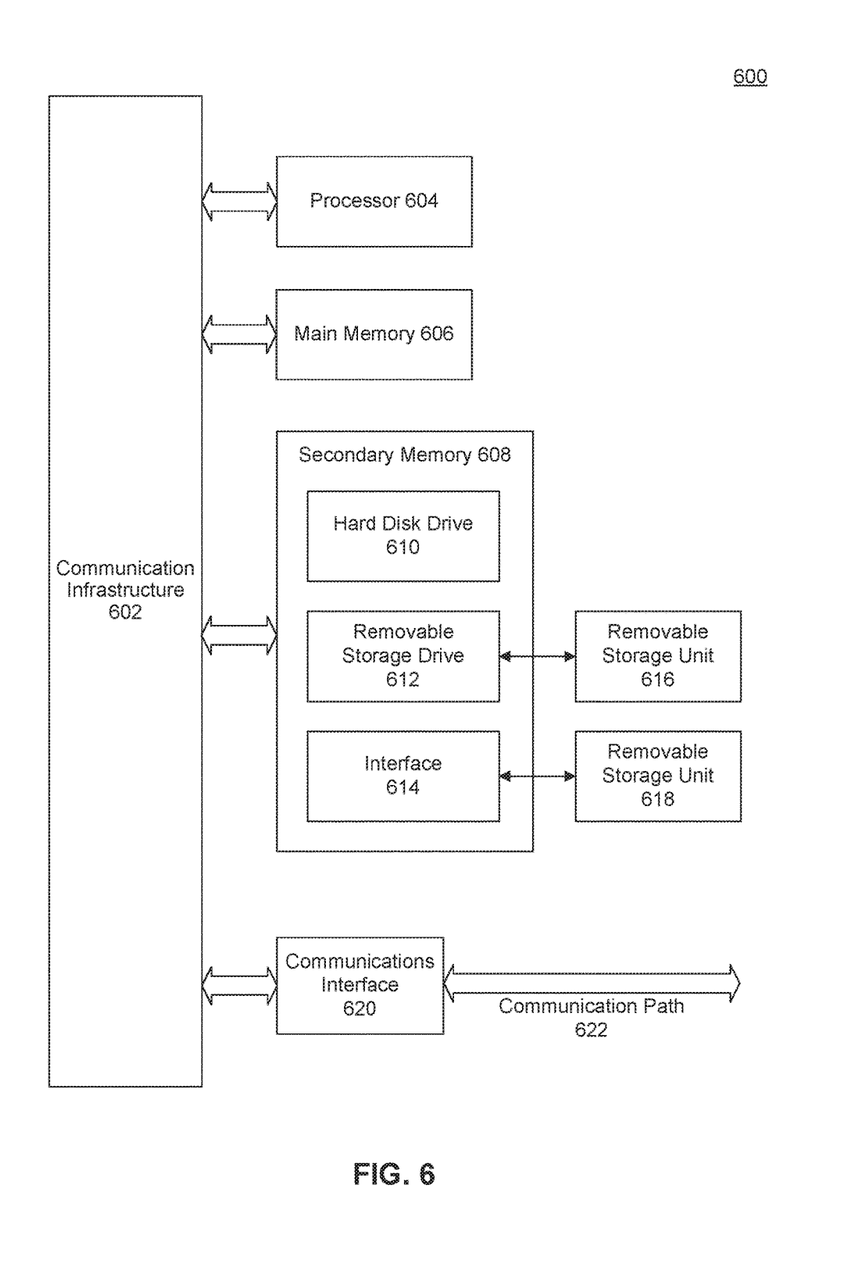
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for dynamically configuring audio reproduction via a local speaker device, the local speaker device being one of a plurality of heterogeneous speaker devices, comprising:
   identifying first performance information associated with the local speaker device;
   receiving, at the local speaker device, second performance information associated with a remote speaker device of the plurality of heterogeneous speaker devices;
   comparing the first performance information to the second performance information;
   determining that the local speaker device is a preferred output device at a mapping of a frequency band to a speaker volume based at least in part on comparing the first performance information to the second performance information;
   generating a filter setting of the local speaker device indicating that the local speaker device is the preferred output device at the mapping of the frequency band to the speaker volume;
   receiving, at the local speaker device, an audio signal associated with digital content, at least a portion of the audio signal to be reproduced by the local speaker device;
   determining a volume setting associated with the audio signal corresponds to the mapping of the frequency band to the speaker volume; and
   filtering, based on the filter setting and the volume setting, the audio signal to generate a filtered audio signal.

2. The method of claim 1, further comprising reproducing the filtered audio signal via a speaker of the local speaker device.

3. The method of claim 1, wherein the first performance information indicates a first performance value of the local speaker device at the mapping of the frequency band to the speaker volume, the second performance information indicates a second performance value of the remote speaker device at the mapping of the frequency band to the speaker volume, and comparing the first performance information to the second performance information comprises determining that the first performance value is greater than the second performance value.

4. The method of claim 1, wherein the mapping of the frequency band to the speaker volume is a first mapping of a first frequency band to a first speaker volume, the filter setting is a first filter setting, the audio signal is a first audio signal, the volume setting is a first volume setting, the method further comprising:
   determining that the local speaker device is not the preferred output device at a second mapping of a second frequency band to a second speaker volume based at least in part on the comparing;
   generating a second filter setting of the local speaker device indicating that the local speaker device is not the preferred output device at the second mapping of the second frequency band to the second speaker volume;
   receiving, at the local speaker device, a second audio signal associated with the digital content, at least a portion of the second audio signal to be reproduced by the local speaker device;

determining a second volume setting associated with the second audio signal corresponds to the second mapping of the second frequency band to the second speaker volume; and filtering, based on the second filter setting and the second volume setting, the second audio signal to generate a second filtered audio signal.

5. The method of claim 4, wherein the first performance information indicates a first performance value of the local speaker device at the second mapping of the second frequency band to the second speaker volume, the second performance information indicates a second performance value of the remote speaker device at the second mapping of the second frequency band to the second speaker volume, and comparing the first performance information to the second performance information comprises determining that the first performance value is lesser than the second performance value.

6. The method of claim 1, wherein the mapping of the frequency band to the speaker volume is a first mapping of a first frequency band to a first speaker volume, the filter setting is a first filter setting, the audio signal is a first audio signal, the volume setting is a first volume setting, the remote speaker device is a second speaker device, the method further comprising:

adding a third speaker device to the plurality of heterogeneous speaker devices;

receiving third performance information associated with the third speaker device;

comparing the first performance information, the second performance information, and the third performance information;

determining that the local speaker device is not the preferred output device at a second mapping of a second frequency band to a second speaker volume based at least in part on comparing the first performance information, the second performance information, and the third performance information;

generating a second filter setting indicating that the local speaker device is not the preferred output device at the second mapping of the second frequency band to the second speaker volume;

receiving, at the local speaker device, a second audio signal associated with the digital content, at least a portion of the second audio signal to be reproduced by the local speaker device;

determining a second volume setting associated with the second audio signal corresponds to the second mapping of the second frequency band to the second speaker volume; and filtering, based on the second filter setting and the second volume setting, the second audio signal to generate a second filtered audio signal.

7. The method of claim 6, further comprising:

determining that the third speaker device has been removed from the plurality of heterogeneous speaker devices;

determining that the local speaker device is the preferred output device at the second mapping of the second frequency band to a second speaker volume based on comparing the first performance information and the second performance information and determining that the third speaker has been removed from the plurality of heterogeneous speaker devices; and generating a third filter setting indicating that the local speaker device is the preferred output device at the second mapping of the second frequency band to the second speaker volume;

receiving, at the local speaker device, a third audio signal associated with the digital content, at least a portion of the third audio signal to be reproduced by the local speaker device;

determining a third volume setting associated with the third audio signal corresponds to the second mapping of the second frequency band to the second speaker volume; and filtering, based on the third filter setting and the third volume setting, the third audio signal to generate a filtered third audio signal.

8. The method of claim 1, further comprising:

determining a geospatial relationship between the local speaker device and the remote speaker device;

modifying, based on the geospatial relationship, the filter setting to determine a modified filter setting;

receiving, at the local speaker device, a second audio signal associated with the digital content, at least a portion of the second audio signal to be reproduced by the local speaker device; and filtering, based on the modified filter setting, the second audio signal to generate a filtered second audio signal.

9. The method of claim 1, further comprising:

determining a location of the local speaker device within an environment; and modifying, based on the location, the filter setting to determine a modified filter setting;

receiving, at the local speaker device, a second audio signal associated with the digital content, at least a portion of the second audio signal to be reproduced by the local speaker device; and filtering, based on the modified filter setting and the second volume setting, the second audio signal to generate a filtered second audio signal.

10. The method of claim 1, wherein identifying first performance information associated with the local speaker device further comprises:

sending, by the local speaker device, a performance information request to a configuration server, the performance information request including a speaker device identifier corresponding to the local speaker device; and receiving the first performance information from the configuration server.

11. The method of claim 1, wherein the first performance information includes first frequency response information and the second performance information includes second frequency response information.

12. A speaker device, comprising:

a wireless communication interface;

amplifier circuitry and an associated speaker;

a memory storing first performance information indicating a first performance value at a mapping of a frequency band to a device volume; and one or more processors and/or circuits configured to:

receive, via the wireless communication interface, second performance information associated with a remote speaker device;

compare the first performance information to the second performance information;

determine the local speaker device is a preferred output device at the mapping of the frequency band to the device volume; and store, to the memory, a filter setting indicating that the local speaker device is the preferred output device at the mapping of the frequency band to the device volume.

13. The speaker device of claim 12, further comprising a speaker control module of the local speaker device, and wherein the one or more processors and/or circuits are further configured to:
receive, via the wireless communication interface, an audio signal associated with digital content, at least a portion of the audio signal to be reproduced by the local speaker device;
receive a volume setting associated with the audio signal via the speaker control module;
determine that the volume setting corresponds to the mapping of the frequency band to the device volume;
filter, based on the filter setting, the audio signal to generate a filtered audio signal; and
transmit the filtered audio signal to the amplifier for reproduction by the local speaker device.

14. The speaker device of claim 12, further comprising a speaker control module, and wherein the one or more processors and/or circuits are further configured to:
receive, via the speaker control module, a stereo mode command requesting that the local speaker device reproduce digital content in a stereo mode along with the remote speaker device;
receive, via the wireless communication interface, an audio signal associated with digital content, at least a portion of the audio signal to be reproduced by the local speaker device;
identify a stereophonic signal of the audio signal, the stereophonic signal corresponding to a left channel or right channel of the audio signal;
filter the stereophonic signal based at least in part on the filter setting to generate a filtered stereophonic signal; and
transmit the stereophonic signal to the amplifier for reproduction by the local speaker device.

15. The speaker device of claim 12, wherein the one or more processors and/or circuits are further configured to:
identify a positional context of the local speaker device within a listening environment; and
determine the first performance value at the mapping of the frequency band to the device volume based on the positional context.

16. The speaker device of claim 12, wherein the first performance information includes first frequency response information and the second performance information includes second frequency response information.

17. A system, comprising:
a first speaker device associated with first performance information; and
a second speaker device associated with second performance information, the second speaker device including one or more processors and/or circuits configured to:
receive the first performance information associated with the first speaker device;
compare the first performance information to the second performance information;
generate a filter setting indicating that the second speaker device is a preferred output device over the first speaker device at a mapping of a frequency band to a device volume;
wirelessly receive a content signal from a remote content device;
filter the content signal based at least in part on the filter setting to generate a filtered audio signal;
amplify the content signal to determine an amplified content signal; and
reproduce the amplified content signal via a speaker of the second speaker device.

18. The system of claim 17, further comprising: a third speaker device, and wherein the content signal is a first content signal, and the one or more processors and/or circuits are further configured to:
receive third performance information associated with the third speaker device;
compare the first performance information, the second performance information, and the third performance information;
determine that the first speaker device is not the preferred output device at a second mapping of a second frequency band to a second speaker volume based at least in part on comparing the first performance information, the second performance information, and the third performance information;
generate a second filter setting to indicate that the first speaker device is not the preferred output device at the second mapping of the second frequency band to the second speaker volume;
receive, at the second speaker device, a second content signal, at least a portion of the second content signal to be reproduced by the second speaker device;
determine a second volume setting associated with the second content signal corresponds to the second mapping of the second frequency band to the second speaker volume; and
filter, based on the second filter setting and the second volume setting, the second content signal to generate a second filtered audio signal.

19. The system of claim 17, further comprising: a user device including a management application for configuring the first speaker device and the second speaker device, and wherein the one or more processors and/or circuits are further configured to:
reproduce a test signal that includes audio content at a plurality of frequency bands;
receive a performance value at the mapping of the frequency band to the device volume from the user device; and
determine the second performance information based at least in part on the performance value.

20. The system of claim 17, further comprising: a user device including a configuration application for managing the first speaker device and the second speaker device, and wherein the one or more processors and/or circuits are further configured to:
receive at least one of geospatial information or contextual information from the user device; and
determine the second performance information based at least in part on the at least one of the geospatial information or contextual information.

* * * * *